(12) United States Patent
Liu

(10) Patent No.: US 11,201,679 B2
(45) Date of Patent: *Dec. 14, 2021

(54) COMMUNICATIONS METHODS AND USER EQUIPMENT

(71) Applicant: Beijing Zhigu Rui Tuo Tech Co., Ltd., Beijing (CN)

(72) Inventor: Jia Liu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/728,635

(22) Filed: Dec. 27, 2019

(65) Prior Publication Data

US 2020/0136731 A1 Apr. 30, 2020

Related U.S. Application Data

(63) Continuation of application No. 15/539,737, filed as application No. PCT/CN2015/095114 on Nov. 20, 2015, now Pat. No. 10,554,313.

(30) Foreign Application Priority Data

Dec. 27, 2014 (CN) .......................... 201410836009.6

(51) Int. Cl.
*H04B 7/00* (2006.01)
*H04B 13/00* (2006.01)

(52) U.S. Cl.
CPC .................. *H04B 13/005* (2013.01)

(58) Field of Classification Search
CPC .................................... H04B 13/005
USPC ....................................................... 455/41.2
See application file for complete search history.

(56) References Cited

U.S. PATENT DOCUMENTS

| | | | |
|---|---|---|---|
| 6,754,472 B1 | 6/2004 | Williams et al. | |
| 8,903,325 B2 | 12/2014 | Yin | |
| 9,819,395 B2 * | 11/2017 | Kerselaers | ............... H04B 5/02 |
| 10,610,309 B2 * | 4/2020 | Schrock | ................ A61B 90/98 |

(Continued)

FOREIGN PATENT DOCUMENTS

| | | |
|---|---|---|
| CN | 103430604 A | 12/2013 |
| CN | 103605423 A | 2/2014 |

(Continued)

OTHER PUBLICATIONS

International Search Report and Written Opinion for Application No. PCT/CN2015/095114, dated Feb. 25, 2016, 8 pages.

*Primary Examiner* — Kathy W Wang-Hurst
*Assistant Examiner* — Max Mathew
(74) *Attorney, Agent, or Firm* — Sheppard Mullin Richter & Hampton LLP

(57) ABSTRACT

Embodiments of this application provide communications methods and user equipment. A communications method disclosed herein comprises: obtaining, by a user equipment, at least one signal value that is generated based on contact between the user equipment and a human body, where the human body is also in contact with another user equipment; determining at least one transmission parameter at least according to the at least one signal value and a preset transmission parameter rule; and communicating with the another user equipment at least according to the at least one transmission parameter.

22 Claims, 3 Drawing Sheets

(56) References Cited

U.S. PATENT DOCUMENTS

| | | | |
|---|---|---|---|
| 2004/0219890 A1* | 11/2004 | Williams | H04B 13/005 |
| | | | 455/100 |
| 2011/0007035 A1* | 1/2011 | Shai | G06F 3/0338 |
| | | | 345/179 |
| 2011/0022119 A1* | 1/2011 | Parker | H04R 25/606 |
| | | | 607/56 |
| 2012/0290051 A1* | 11/2012 | Boyden | A61N 1/3605 |
| | | | 607/113 |
| 2013/0005285 A1 | 1/2013 | Yin | |
| 2013/0343190 A1* | 12/2013 | Wang | H04L 41/0896 |
| | | | 370/235 |
| 2014/0171053 A1 | 6/2014 | Stephens | |
| 2014/0184555 A1* | 7/2014 | Pi | H04W 76/14 |
| | | | 345/174 |
| 2014/0304807 A1* | 10/2014 | Braun | G06F 21/34 |
| | | | 726/17 |
| 2015/0217122 A1* | 8/2015 | Leskosek | A61N 1/365 |
| | | | 607/7 |
| 2016/0173169 A1* | 6/2016 | Liu | H04B 5/0012 |
| | | | 455/41.1 |
| 2017/0373762 A1 | 12/2017 | Liu | |
| 2017/0373763 A1 | 12/2017 | Liu | |

FOREIGN PATENT DOCUMENTS

| | | |
|---|---|---|
| CN | 203882299 U | 10/2014 |
| CN | 104507039 A | 4/2015 |
| CN | 104571507 A | 4/2015 |
| WO | 2008136578 A1 | 11/2008 |
| WO | 2012113132 A1 | 8/2012 |

\* cited by examiner

COMMUNICATIONS METHODS AND USER EQUIPMENT

CROSS-REFERENCE TO RELATED APPLICATION

This application is a continuation of U.S. patent application Ser. No. 15/539,737, filed on Jun. 26, 2017, entitled "Communications Methods and User Equipments", which is a National Phase Application of International Application No. PCT/CN2015/095114, filed on Nov. 20, 2015, which is based on and claims priority to and benefit of Chinese Patent Application No. 201410836009.6, filed with China National Intellectual Property Administration (CNIPA) of People's Republic of China on Dec. 27, 2014, and entitled "Communications Method and Apparatus". The entire disclosures of all of the above-identified applications are incorporated herein by reference.

TECHNICAL FIELD

Embodiments of this application generally relate to the field of communications technologies, and in particular, to communications methods and user equipment.

BACKGROUND

Due to the limited power, a large number of sensor devices and wearable devices tend to use a low power consumption network technology in wireless connection, such as Zigbee and Bluetooth Low Energy (BLE). This type of network usually supports a variable connection interval so that the most appropriate transmission frequency is used according to particular data transmission demands, thus reducing energy consumption.

Taking a BLE as an example, after a data connection is established, a device can set or change at least one connection parameter. Specifically, the BLE provides two connection parameters. One is a connection interval, that is a data sending interval between a master device and a slave device, and the value range of the interval is from 7.5 ms to 4.0 s. The other is a slave device delay that is the number of connection intervals the slave device is allowed to delay monitoring. In this way, the slave device can skip several connection intervals before executing one monitoring, which further reduces energy consumption thereof.

In some application scenarios, a user needs to quickly access and check data. For example, a user wearing a smart wristband wants to check physical feature data on a mobile phone that is connected to the smart wristband. At this moment, the connection parameters need to be adjusted to accelerate the speed of data acquisition. However, the data transmission interval between devices is usually relatively big. Although the user can set a smaller connection interval, the setting instruction needs to wait for the next transmission opportunity to be sent to a peer device. In other words, a relatively long time still needs to be taken before completing adjustment of the connection parameters, and further to communicate with the peer.

SUMMARY

In view of this, a purpose of embodiments of this application is to provide a communications solution between devices.

In order to achieve the above purpose, according to a first aspect of the embodiments of this application, a communications method is provided, comprising:

obtaining, by a user equipment, at least one signal value that is generated based on contact between the user equipment and a human body, wherein the human body is also in contact with another user equipment;

determining at least one transmission parameter at least according to the at least one signal value and a preset transmission parameter rule; and communicating with the another user equipment at least according to the at least one transmission parameter.

In order to achieve the above purpose, according to a second aspect of the embodiments of this application, a communications method is provided, comprising:

controlling, by a user equipment, a capacitance value of the user equipment to change at at least one frequency;

determining at least one transmission parameter at least according to the at least one frequency and a preset transmission parameter rule; and communicating with another user equipment at least according to the at least one transmission parameter, wherein the user equipment and the another user equipment are both in contact with a human body.

In order to achieve the above purpose, according to a third aspect of the embodiments of this application, a user equipment is provided, comprising:

an obtaining module, configured to obtain at least one signal value that is generated based on contact between the user equipment and a human body, wherein the human body is also in contact with another user equipment;

a determining module, configured to determine at least one transmission parameter at least according to the at least one signal value and a preset transmission parameter rule; and a communications module, configured to communicate with the another user equipment at least according to the at least one transmission parameter.

In order to achieve the above purpose, according to a forth aspect of the embodiments of this application, a user equipment is provided, comprising:

a control module, configured to control a capacitance value of the user equipment to change at at least one frequency;

a determining module, configured to determine at least one transmission parameter at least according to the at least one frequency and a preset transmission parameter rule; and a communications module, configured to communicate with another user equipment at least according to the at least one transmission parameter, wherein the user equipment and the another user equipment are both in contact with a human body.

At least a technical solution of the above multiple technical solutions has the following advantages:

In the embodiments of this application: obtaining, by a user equipment, at least one signal value that is generated based on contact between the user equipment and a human body, wherein the human body is also in contact with another user equipment; determining at least one transmission parameter at least according to the at least one signal value and a preset transmission parameter rule; communicating with the another user equipment at least according to the at least one transmission parameter, a communications solution between devices is provided. Determining at least one transmission parameter for communication between devices through an out-band method can facilitate quick and convenient communication.

DETAILED DESCRIPTION

Implementation manners of this application are described in the following in more detail with reference to the accompanying drawings and the embodiments. The following embodiments are used to describe this application, but not to limit the scope of this application.

Figure 1:
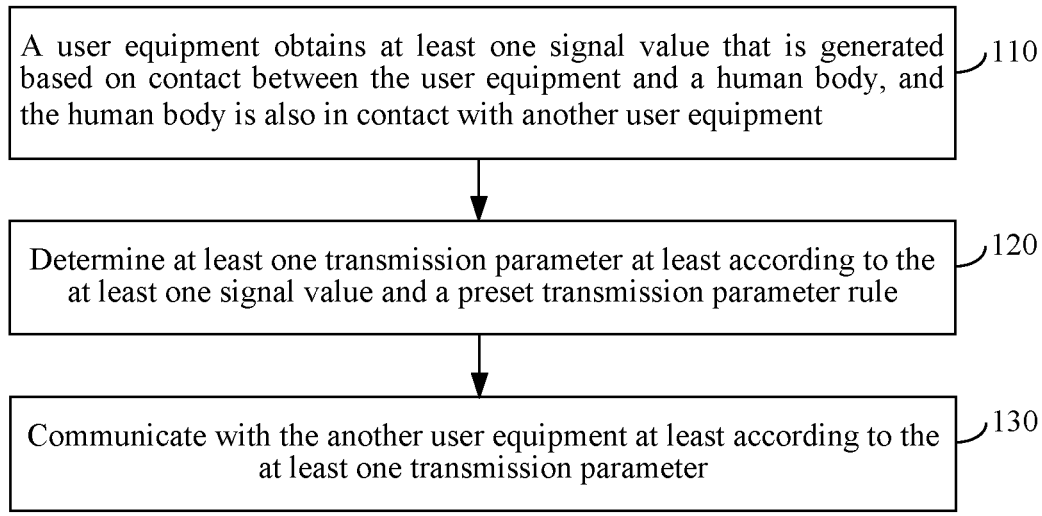
FIG. 1 is a schematic flowchart of Embodiment 1 of a communications method that is provided by this application.

FIG. 1 is a schematic flowchart of Embodiment 1 of a communications method that is provided by this application. As shown in FIG. 1, this embodiment comprises:

110. A user equipment obtains at least one signal value that is generated based on contact between the user equipment and a human body, and the human body is also in contact with another user equipment.

In this embodiment, each of the user equipment and the another user equipment can be any device that can interact with a user, comprising but not limited to: a handheld device, a wearable device, etc., wherein the handheld device comprises but is not limited to: a mobile phone, a pad (PAD), etc.; and the wearable device comprises but is not limited to: a smart wristband, a smart ring, etc.

In this embodiment, the equipment type of the another user equipment and that of the user equipment can be the same or can be different. For example, the user equipment is a mobile phone, and the another user equipment is another mobile phone or a pad; and the user equipment is a mobile phone, and the another user equipment is a smart wristband.

In this embodiment, the user equipment can be in contact with any part of the human body. For example, when the user equipment is a mobile phone, the user equipment is optionally in contact with a finger, a palm, or other part of the human body; and when the user equipment is a smart wristband, the user equipment is optionally in contact with a finger, a palm, a wrist, or other part of the human body.

In this embodiment, the another user equipment can be in contact with any part of the human body. For example, when the another user equipment is a mobile phone, the another user equipment is optionally in contact with a finger, a palm, or other part of the human body; and when the another user equipment is a smart wristband, the another user equipment is optionally in contact with a finger, a palm, a wrist, or other part of the human body.

In this embodiment, the at least one signal value may be one signal value or multiple signal values.

In this embodiment, the at least one signal value can be generated at the beginning when the user equipment contacts with the human body, or be generated at the time when the another user equipment contacts with the human body during the process that the user equipment is being in contact with the human body.

120. Determine at least one transmission parameter at least according to the at least one signal value and a preset transmission parameter rule.

In this embodiment, at least one transmission parameter can be one transmission parameter or multiple transmission parameters.

In this embodiment, the at least one transmission parameter comprises but is not limited to at least one of the following: a transmission channel, a transmission delay, and a codeword, wherein the transmission channel refers to a data signal transmission channel in which wireless signals act as transmission medium. For example, for a frequency hopping communication, a hopping sequence number (HSN) can be used to identify the transmission channel, wherein for a sender of information, the transmission delay is used to determine beginning time of sending the information, and for a receiver of the information, the transmission delay is used to determine beginning time of receiving the information, wherein the codeword is also known as a code pattern; for the sender of the information, the codeword is used to encode the information to be sent, and for the receiver of the information, the codeword is used to decode the information received.

In this embodiment, the transmission parameter rule comprises: a corresponding relationship of at least one signal value and at least one transmission parameter, and/or a corresponding relationship of at least one signal value range and at least one transmission parameter.

In the scenario that the transmission parameter rule comprises the corresponding relationship of at least one signal value range and at least one transmission parameter, error of the at least one transmission parameter that is caused by measurement error of the at least one signal value can be reduced to a certain degree.

130. Communicate with the another user equipment at least according to the at least one transmission parameter.

In this embodiment, since the user equipment and the another user equipment are both in contact with the human body, during the process that the user equipment performs step 110 to step 120, the another user equipment can also obtain at least one corresponding signal value, and determine at least one transmission parameter that is the same as that determined by the user equipment, based on the same transmission parameter rule, so that the user equipment and the another user equipment can communicate with each other based on at least one same transmission parameter.

In this embodiment, the communications contents of the user equipment and the another user equipment can be of multiple types, such as an instruction, sensor data, and a connection parameter that needs to be set.

In this embodiment: obtaining, by a user equipment, at least one signal value that is generated based on contact between the user equipment and a human body, wherein the human body is also in contact with another user equipment; determining at least one transmission parameter at least according to the at least one signal value and a preset transmission parameter rule; communicating with the another user equipment at least according to the at least one transmission parameter, a communications solution between devices is provided. And determining at least one transmission parameter for communication between devices through an out-band method can achieve quick and convenient communication.

The methods of this embodiment will now be further described by way of the following optional implementation manners.

In this embodiment, the at least one signal value can have multiple implementation manners.

In an optional implementation manner, the at least one signal value is a static electricity variation of the user equipment.

Specifically, the static electricity variation is an electrostatic charge variation.

Specifically, the static electricity variation is an increment of the static electricity or a decrement of the static electricity.

In a possible scenario, the user equipment contacts with the human body first, and collects the electrostatic charges of the human body to make the amount of the electrostatic charges of the human body 0 or close to 0. Then during the process that the user equipment is being in contact with the human body, the another user equipment contacts with the human body. At this moment, electrostatic charges of the another user equipment are transferred to the human body, and the electrostatic charges that are transferred to the human body are also collected by the user equipment. Therefore, the static electricity variation of the user equipment is equal to or is almost equal to the static electricity variation of the another user equipment, and the static electricity variation of the user equipment and the static electricity variation of the another user equipment are the same in terms of amount, but differ in the direction of variation, that is, the increment of the static electricity of the user equipment is equal to or is substantially equal to the decrement of the static electricity of the another user equipment.

In another possible scenario, the another user equipment contacts with the human body first, and collects the electrostatic charges of the human body to make the amount of the electrostatic charges of the human body 0 or close to 0. Then during the process that the another user equipment is being in contact with the human body, the user equipment contacts with the human body. At this moment, electrostatic charges of the user equipment are transferred to the human body, and the electrostatic charges that are transferred to the human body are also collected by the another user equipment. Therefore, the static electricity variation of the user equipment is equal to or is almost equal to the static electricity variation of the another user equipment, and the static electricity variation of the user equipment and the static electricity variation of the another user equipment differ merely in the direction of variation, that is, the decrement of the static electricity of the user equipment is equal to or is substantially equal to the increment of the static electricity of the another user equipment.

In this implementation manner, the transmission parameter rule comprises: a corresponding relationship of a static electricity variation and at least one transmission parameter, and/or a corresponding relationship of a static electricity variation range and at least one transmission parameter.

For example, under the transmission parameter rule, a static electricity variation 50 mC is corresponding to a transmission delay of 5 ms, and a static electricity variation 100 mC is corresponding to a transmission delay of 10 ms. For another example, under the transmission parameter rule, a static electricity variation range [50 mC, 60 mC) is corresponding to a transmission delay of 5 ms and a first codeword, and a static electricity variation range [100 mC, 110 mC) is corresponding to a transmission delay of 10 ms and a second codeword.

In another optional implementation manner, the at least one signal value is at least one change frequency of an equivalent capacitance on the user equipment side, wherein the equivalent capacitance on the user equipment side is the equivalent capacitance that is detected on the user equipment side.

Specifically, since the user equipment and the another user equipment are both in contact with the human body, the equivalent capacitance on the user equipment side is at least affected by the capacitance value of the human body and the capacitance value of the another user equipment.

In the implementation manner, optionally, the another user equipment controls the capacitance value of the another user equipment itself to change at the at least one frequency, wherein the capacitance value of the another user equipment itself refers to a capacitance value of ground capacitance of the another user equipment. Correspondingly, when the user equipment and the another user equipment are both in contact with the human body, the user equipment can detect the change, and obtains the at least one frequency.

Figure 2A:
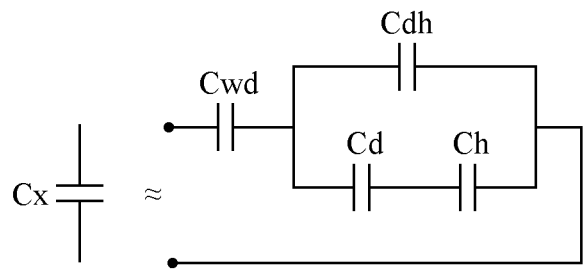
FIG. 2A is a schematic diagram of an equivalent capacitance when the user equipment is in contact with the human body.

In a possible scenario, the user equipment is a smart wristband. When the smart wristband is worn on a wrist of the human body, FIG. 2A is a schematic circuit diagram of an equivalent capacitance when the user equipment is in contact with the human body. As shown in FIG. 2A, Cwd is a capacitance between the wrist and the smart wristband, Cdh is a capacitance between the smart wristband and the human body, Cd is a capacitance of the smart wristband itself, Ch is a capacitance of the human body itself, and Cx is an equivalent capacitance on the user equipment side.

Figure 2B:
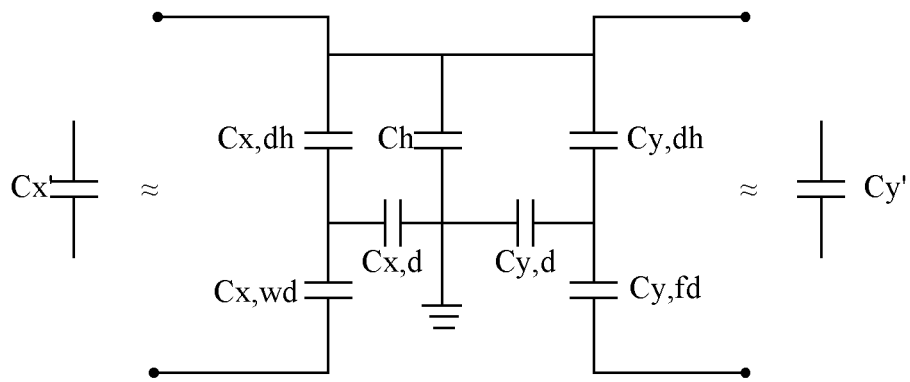
FIG. 2B is a schematic diagram of equivalent capacitances when the user equipment and the another user equipment are both in contact with the human body.

In this scenario, the another user equipment is a mobile phone. When the human body touches the mobile phone with a finger of the hand that wears the smart wristband, FIG. 2B is a schematic circuit diagram of equivalent capacitances when the user equipment and the another user equipment are both in contact with the human body. As shown in FIG. 2B, Cx,wd is the capacitance between the wrist and the smart wristband. Cx,dh is the capacitance between the smart wristband and the human body. Cx,d is the capacitance of the smart wristband itself. Ch is the capacitance of the human body itself. Cy,fd is a capacitance between the finger and the mobile phone. Cy,dh is a capacitance between the mobile phone and the human body. Cy,d is a capacitance of the mobile phone itself, Cx' is an equivalent capacitance on the user equipment side, and Cy' is an equivalent capacitance on the another user equipment side. It can be seen from FIG. 2B that when the Cy,d changes at at least one frequency, the Cx' also changes correspondingly at the at least one frequency. Therefore, the at least one frequency can be detected on the user equipment side.

In the implementation manner, the transmission parameter rule comprises: a corresponding relationship of at least one frequency and at least one transmission parameter, and/or a corresponding relationship of at least one frequency range and at least one transmission parameter.

For example, under the transmission parameter rule, 50 Hz is corresponding to a transmission delay of 5 ms and a first codeword, and 80 Hz is corresponding to a transmission delay of 8 ms and a second codeword. For another example, under the transmission parameter rule, [50 Hz, 60 Hz) is corresponding to a first codeword, and [80 Hz, 90 Hz) is corresponding to a second codeword.

In another optional implementation manner, the at least one signal value is a coupling capacitance value at the location where the user equipment is in contact with the human body.

For example, a finger of the human body is in contact with a capacitive touch screen of the user equipment. The contact of the finger corresponds to a parallel connection of a coupling capacitor in the contact location of the capacitive touch screen to cause a change of current and voltage of a sensor circuit of the capacitive touch screen. Correspondingly, the user equipment can determine the capacitance value of the coupling capacitor based on the change of the current and the voltage of the sensor circuit, that is, the coupling capacitance value.

In this implementation manner, optionally, the determining at least one transmission parameter at least according to the at least one signal value and the preset transmission parameter rule comprises:

determining an induced charge quantity generated from the location where the human body is in contact with the user equipment at least according to the coupling capacitance value and the transmission parameter rule;

determining the at least one transmission parameter at least according to the induced charge quantity.

Specifically, a corresponding relationship of the induced charge quantity and the coupling capacitance value can be obtained through learning in advance. Correspondingly, according to the corresponding relationship and the coupling capacitance value actually obtained in step 110, the induced charge quantity can be determined.

In the implementation manner, the transmission parameter rule comprises: a corresponding relationship of induced charge quantity and at least one transmission parameter, and/or a corresponding relationship of induced charge quantity range and at least one transmission parameter.

For example, an induced charge quantity 50 mC is corresponding to a first transmission channel, and an induced charge quantity 100 mC is corresponding to a second transmission channel. For another example, an induced charge quantity range [50 mC, 100 mC) is corresponding to a first transmission channel, a first codeword and a transmission delay of 5 ms. An induced charge quantity range [100 mC, 50 mC) is corresponding to a second transmission channel, a second codeword and a transmission delay of 10 ms.

In a possible scenario, the another user equipment contacts with the human body first, and collects the electrostatic charges of the human body to make the amount of the electrostatic charges of the human body 0 or close to 0. Then during the process that the another user equipment is being in contact with the human body, the user equipment contacts with the human body. At this moment, induced charges are generated at the location where the human body is in contact with the user equipment. The charge quantity of the induced charges decides the coupling capacitance value at the location where the user equipment is in contact with the human body. At the same time, charges that are generated at the location where the human body is in contact with the user equipment is collected by the another user equipment, the charge quantity of which is equal to that of the induced charges and the polarity of which is opposite to that of the induced charges. Therefore, the induced charge quantity that is determined by the user equipment is equal to or is almost equal to the static electricity variation of the another user equipment. The induced charge quantity that is determined by the user equipment and the static electricity variation of the another user equipment merely differ in the polarity of the charges.

Figure 3:
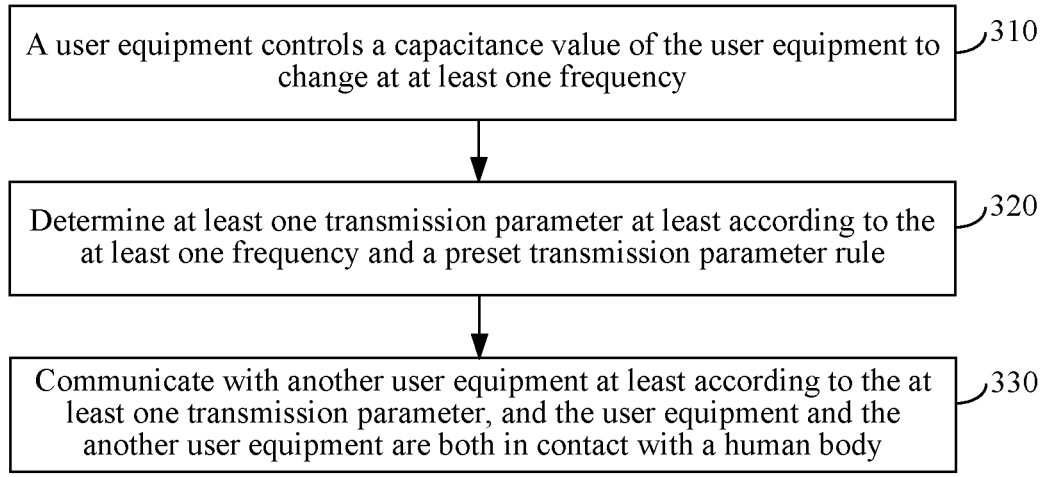
FIG. 3 is a schematic flowchart of Embodiment 2 of a communications method that is provided by this application.

FIG. 3 is a schematic flowchart of Embodiment 2 of a communications method that is provided by this application. As shown in FIG. 3, this embodiment comprises:

310. A user equipment controls a capacitance value of the user equipment to change at at least one frequency.

In this embodiment, the user equipment can be any device that can interact with a user, comprising but not limited to: a handheld device, a wearable device, etc., wherein the handheld device comprises but is not limited to: a mobile phone, a pad (PAD), etc.; and the wearable device comprises but is not limited to: a smart wristband, a smart ring, etc.

In this embodiment, the capacitance value of the user equipment itself is a capacitance value of ground capacitance of the user equipment.

In this embodiment, there can be multiple methods through which the user equipment may control the capacitance value change of the user equipment. For example, the user equipment controls the capacitance value change of a changeable capacitor of the user equipment to make the capacitance value of ground capacitance of the user equipment change, wherein the changeable capacitor can be set on a circuit board of the user equipment.

In this embodiment, the at least one frequency may be one frequency or multiple frequencies.

320. Determine at least one transmission parameter at least according to the at least one frequency and a preset transmission parameter rule.

In this embodiment, the at least one transmission parameter may be one transmission parameter or multiple transmission parameters.

In this embodiment, the at least one transmission parameter comprises but is not limited to at least one of the following: a transmission channel, a transmission delay, and a codeword, wherein the transmission channel refers to a data signal transmission channel in which wireless signals act as transmission medium. For example, for a frequency hopping communication, an HSN can be used to identify the transmission channel, wherein for a sender of information, the transmission delay is used to determine beginning time of sending the information, and for a receiver of the information, the transmission delay is used to determine beginning time of receiving the information, wherein the codeword is also known as a code pattern; for the sender of the information, the codeword is used to encode the information to be sent, and for the receiver of the information, the codeword is used to decode the information received.

In this embodiment, the transmission parameter rule comprises: a corresponding relationship of at least one frequency and at least one transmission parameter, and/or a corresponding relationship of at least one frequency range and at least one transmission parameter.

For example, 50 Hz is corresponding to a transmission delay of 5 ms, and 80 Hz is corresponding to a transmission delay of 10 ms. For another example, 50 Hz and 60 Hz are corresponding to a transmission delay of 5 ms, and 70 Hz and 80 Hz are corresponding to a transmission delay of 10 ms. For another example, a frequency range [50 Hz, 60 Hz) is corresponding to a transmission delay of 5 ms and a first codeword, and a frequency range [60 Hz, 70 Hz) is corresponding to a transmission delay of 6 ms and a second codeword.

In this embodiment, the sequence of step 310 and step 320 can be arbitrary. For example, step 310 is performed first then step 320 is performed. Or step 320 is performed first then step 310 is performed. Or step 310 and step 320 are performed simultaneously.

330. Communicate with another user equipment at least according to the at least one transmission parameter, and the user equipment and the another user equipment are both in contact with a human body.

In this embodiment, the another user equipment can be any device that can interact with a user, comprising but not limited to: a handheld device, a wearable device, etc., wherein the handheld device comprises but is not limited to: a mobile phone, a pad (PAD), etc.; and the wearable device comprises but is not limited to: a smart wristband, a smart ring, etc.

In this embodiment, the equipment type of the another user equipment and that of the user equipment can be the same or can be different. For example, the user equipment is a mobile phone, and the another user equipment is another mobile phone or a pad; and the user equipment is a mobile phone, and the another user equipment is a smart wristband.

In this embodiment, the user equipment can be in contact with any part of the human body. For example, when the user equipment is a mobile phone, the user equipment is optionally in contact with a finger, a palm, or other part of the human body; and when the user equipment is a smart wristband, the user equipment is optionally in contact with a finger, a palm, a wrist, or other part of the human body.

In this embodiment, the another user equipment can be in contact with any part of the human body. For example, when the another user equipment is a mobile phone, the another user equipment is optionally in contact with a finger, a palm, or other part of the human body; and when the another user equipment is a smart wristband, the another user equipment is optionally in contact with a finger, a palm, a wrist, or other part of the human body.

In this embodiment, the user equipment and the another user equipment are both in contact with the human body. The equivalent capacitance in the scenario is as shown in FIG. 2B. Therefore, when the user equipment performs step 310, the another user equipment can obtain the at least one frequency, and determine at least one transmission parameter that is the same as that determined by the user equipment based on the same transmission parameter rule, so that the user equipment and the another user equipment can communicate with each other based on the same at least one transmission parameter.

In the scenario that the transmission parameter rule comprises the corresponding relationship of at least one frequency range and at least one transmission parameter, error of the at least one transmission parameter that is caused by measurement error of the at least one frequency of the another user equipment can be reduced to a certain degree.

In this embodiment, the communications contents of the user equipment and the another user equipment can be of multiple types, such as an instruction, sensor data, and a connection parameter that needs to be set.

In this embodiment, a user equipment controls the capacitance value of the user equipment to change at at least one frequency, determines at least one transmission parameter at least according to the at least one frequency and a preset transmission parameter rule, and communicates with another user equipment at least according to the at least one transmission parameter. The user equipment and the another use equipment are both in contact with a human body. A communications solution between devices is provided, and determining at least one transmission parameter for communication between devices through an out-band method can achieve quick and convenient communication. The methods of this embodiment will now be further described by way of the following optional implementation manners.

In this embodiment, step 310 has multiple implementation manners.

In an optional implementation manner, the controlling, by the user equipment, the capacitance value of the user equipment to change at at least one frequency comprises:

controlling, by the user equipment, the capacitance value of the user equipment to change at the at least one frequency in response to the contact between the user equipment and the human body.

Optionally, when the user equipment detects contact with a human body, controlling the capacitance value of the user equipment to change at the at least one frequency, wherein the at least one frequency can be set in advance.

In another optional implementation manner, the controlling, by the user equipment, the capacitance value of the user equipment to change at at least one frequency comprises:

controlling, by the user equipment, the capacitance value of the user equipment to change at the at least one frequency in response to a user instruction.

Specifically, the user instruction can be sent by a user corresponding to the human body that is in contact with the user equipment.

In the implementation manner, optionally, the at least one frequency may be carried in the user instruction.

Specifically, the at least one frequency can be designated by the user, or can be set in advance.

In this embodiment, optionally, the at least one frequency may be multiple frequencies;

correspondingly, the controlling, by the user equipment, the capacitance value of the user equipment to change at at least one frequency comprises: controlling, by the user equipment, the capacitance value of the user equipment to change at the multiple frequencies in sequence.

Optionally, the user equipment controls the capacitance value of the user equipment to change at the multiple frequencies in a pattern of circulation in sequence.

Optionally, when the sequence among the multiple frequencies is different, the at least one corresponding transmission parameter can be the same or can be different.

For example, the multiple frequencies comprise: f1, f2 and f3. The user equipment controls the capacitance value of the user equipment to change in sequence of frequencies f1, f2 and f3. The multiple frequencies comprise: f1, f3 and f2. The user equipment controls the capacitance value of the user equipment to change in sequence of frequencies f1, f3 and f2. Further, at least one transmission parameter corresponding to f1, f2 and f3 and at least one transmission parameter corresponding to f1, f3 and f2 can be the same or can be different.

In the above implementation manner, optionally, the controlling, by the user equipment, the capacitance value of the user equipment to change at the at least one frequency in response to the contact between the user equipment and the human body comprises:

controlling, by the user equipment, the capacitance value of the user equipment to change at the multiple frequencies in sequence in response to the contact between the user equipment and the human body.

In the above implementation manner, optionally, the controlling, by the user equipment, the capacitance value of the user equipment to change at the at least one frequency in response to a user instruction comprises:

controlling, by the user equipment, the capacitance value of the user equipment to change at the multiple frequencies in sequence in response to a user instruction.

In this embodiment, the controlling, by the user equipment, the capacitance value of the user equipment to change at at least one frequency can be controlling, by the user equipment, to change continuously or to change discretely at the at least one frequency.

For example, at least one frequency is a frequency f1. The capacitance value of the user equipment is C1 when t=0. Correspondingly, in step 310, the user equipment can control the capacitance value of the user equipment to change into C2 when t=1/f1, and controls the capacitance value of the user equipment to change into C1 when t=2/f1. Or in step 310, the user equipment can control the capacitance value of the user equipment to gradually change into C2 from C1 during the time when t=0~1/f1, and controls the capacitance value of the user equipment to gradually change into C1 from C2 when t=1/f1~2/f1.

Figure 4A:
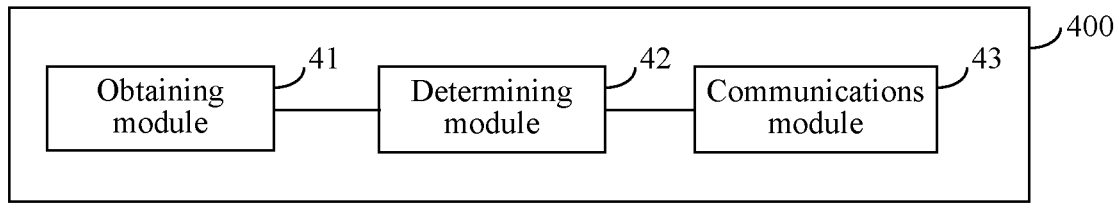
FIG. 4A is a schematic structural diagram of Embodiment 1 of a user equipment that is provided by this application.

FIG. 4A is a schematic structural diagram of Embodiment 1 of a user equipment that is provided by this application. As shown in FIG. 4A, a user equipment 400 comprises:

an obtaining module 41, configured to obtain at least one signal value that is generated based on contact between a user equipment 400 and a human body, wherein the human body is also in contact with another user equipment;

a determining module 42, configured to determine at least one transmission parameter at least according to the at least one signal value and a preset transmission parameter rule; and a communications module 43, configured to communicate with the another user equipment at least according to the at least one transmission parameter.

In this embodiment, each of a user equipment 400 and the another user equipment can be any device that can interact with a user, comprising but not limited to: a handheld device, a wearable device, etc., wherein the handheld device comprises but is not limited to: a mobile phone, a pad, etc.; and the wearable device comprises but is not limited to: a smart wristband, a smart ring, etc.

In this embodiment, the equipment type of the another user equipment and that of the user equipment 400 can be the same or can be different. For example, the user equipment 400 is a mobile phone, and the another user equipment is another mobile phone or a pad; and the user equipment 400 is a mobile phone, and the another user equipment is a smart wristband.

In this embodiment, the user equipment 400 can be in contact with any part of the human body. For example, when the user equipment 400 is a mobile phone, the user equipment 400 is optionally in contact with a finger, a palm, or other part of the human body; and when the user equipment 400 is a smart wristband, the user equipment 400 is optionally in contact with a finger, a palm, a wrist, or other part of the human body.

In this embodiment, the another user equipment can be in contact with any part of the human body. For example, when the another user equipment is a mobile phone, the another user equipment is optionally in contact with a finger, a palm, or other part of the human body; and when the another user equipment is a smart wristband, the another user equipment is optionally in contact with a finger, a palm, a wrist, or other part of the human body.

In this embodiment, the at least one signal value can be one signal value or multiple signal values.

In this embodiment, the at least one signal value can be generated at the beginning when the user equipment 400 contacts with the human body, and can also be generated at the time when another user equipment contacts with the human body during the process that the user equipment 400 is being in contact with the human body.

In this embodiment, the at least one transmission parameter can be one transmission parameter or multiple transmission parameters.

In this embodiment, the at least one transmission parameter comprises but is not limited to at least one of the following: a transmission channel, a transmission delay, and a codeword, wherein the transmission channel refers to a data signal transmission channel in which wireless signals act as transmission medium. For example, for a frequency hopping communication, an HSN can be used to identify the transmission channel, wherein for a sender of information, the transmission delay is used to determine beginning time of sending the information, and for a receiver of the information, the transmission delay is used to determine beginning time of receiving the information, wherein the codeword is also known as a code pattern; for the sender of the information, the codeword is used to encode the information to be sent, and for the receiver of the information, the codeword is used to decode the information received.

In this embodiment, the transmission parameter rule comprises: a corresponding relationship of at least one signal value and at least one transmission parameter, and/or a corresponding relationship of at least one signal value range and at least one transmission parameter.

In the scenario that the transmission parameter rule comprises the corresponding relationship of at least one signal value range and at least one transmission parameter, error of the at least one transmission parameter that is caused by measurement error of the at least one signal value can be reduced to a certain degree.

In this embodiment, since the user equipment 400 and the another user equipment are both in contact with the human body, during the process that the obtaining module 41 obtains the at least one signal value and the determining module 42 determines the at least one transmission parameter, the another user equipment can also obtain at least one corresponding signal value, and determine at least one transmission parameter that is the same as that determined by the determining module 42 based on the same transmission parameter rule, so that the user equipment 400 and the another user equipment can communicate with each other based on the same at least one transmission parameter.

In this embodiment, the communications contents of the communications module 43 and the another user equipment can be of multiple types, such as an instruction, sensor data, and a connection parameter that needs to be set.

In this embodiment: obtaining, by an obtaining module, at least one signal value that is generated based on contact between the user equipment and a human body, wherein the human body is also in contact with another user equipment; determining, by the determining module, at least one transmission parameter at least according to the at least one signal value and a preset transmission parameter rule; communicating, by a communications module, with the another user equipment at least according to the at least one transmission parameter, a communications solution between devices is provided. And determining at least one transmission parameter for communication between devices through an outband method can achieve quick and convenient communication.

A user equipment 400 of this embodiment will now be further described by way of the following optional implementation manners.

In this embodiment, the at least one signal value can have multiple implementation manners.

In an optional implementation manner, the at least one signal value is a static electricity variation of the user equipment 400.

In the implementation manner, optionally, the user equipment 400 also comprises: an electrostatic charge collecting element.

Reference may be made to a corresponding description in Embodiment 1 of a communications method that is provided by this application for specific implementation of the implementation manner.

In another optional implementation manner, the at least one signal value is at least one change frequency of an equivalent capacitance on the user equipment 400 side.

Reference may made to a corresponding description in Embodiment 1 of a communications method that is provided by this application for specific implementation of the implementation manner.

In another optional implementation manner, the at least one signal value is a coupling capacitance value at the location where the user equipment 400 is in contact with the human body.

Figure 4B:
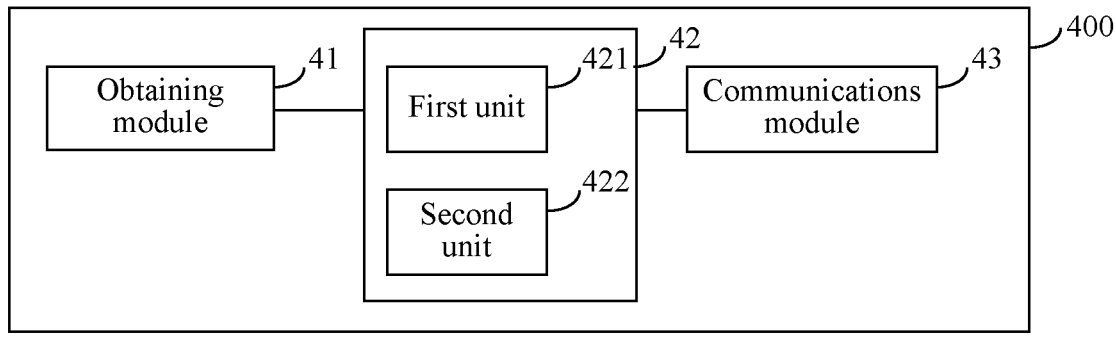
FIG. 4B is a schematic structural diagram of an implementation manner of Embodiment 1 shown in FIG. 4A.

In the implementation manner, optionally, as shown in FIG. 4B, the determining module 42 comprises:

a first unit 421, configured to determine an induced charge quantity generated from the location where the human body is in contact with the user equipment 400 at least according to the coupling capacitance value; and a second unit 422, configured to determine the at least one transmission parameter at least according to the induced charge quantity and the transmission parameter rule.

Reference may be made to a corresponding description in Embodiment 1 of a communications method that is provided by this application for specific implementation of the implementation manner.

Figure 5:
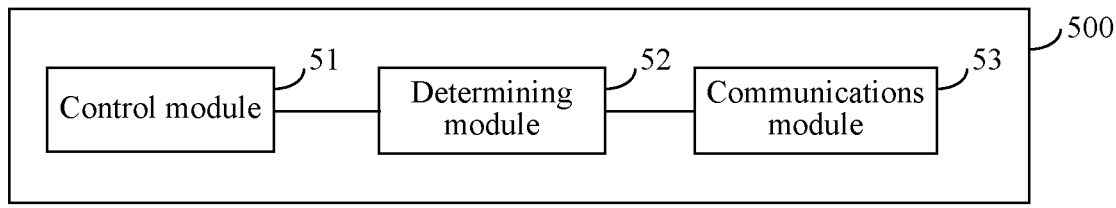
FIG. 5 is a schematic structural diagram of Embodiment 2 of a user equipment that is provided by this application.

FIG. 5 is a schematic structural diagram of Embodiment 2 of a user equipment that is provided by this application. As shown in FIG. 5, a user equipment 500 comprises:

a control module 51, configured to control a capacitance value of the user equipment 500 to change at at least one frequency;

a determining module 52, configured to determine at least one transmission parameter at least according to the at least one frequency and a preset transmission parameter rule; and a communications module 53, configured to communicate with another user equipment at least according to the at least one transmission parameter, wherein the user equipment 500 and the another user equipment are both in contact with a human body.

In this embodiment, the user equipment 500 can be any device that can interact with a user, comprising but not limited to: a handheld device, a wearable device, etc., wherein the handheld device may be but is not limited to: a mobile phone, a pad, etc.; and the wearable device comprises but is not limited to: a smart wristband, a smart ring, etc.

In this embodiment, the capacitance value of the user equipment 500 is a capacitance value of ground capacitance of the user equipment 500.

In this embodiment, there can be multiple methods through which the control module 51 may control the capacitance value change of the user equipment 500. For example, the control module 51 may control the capacitance value change of a changeable capacitor of the user equipment 500 to make the capacitance value of ground capacitance of the user equipment 500 change, wherein the changeable capacitor can be set on a circuit board of the user equipment 500.

In this embodiment, the at least one frequency can be one frequency or multiple frequencies.

In this embodiment, the at least one transmission parameter may be one transmission parameter or multiple transmission parameters.

In this embodiment, the at least one transmission parameter may be, but is not limited to at least one of the following: a transmission channel, a transmission delay, and a codeword, wherein the transmission channel refers to a data signal transmission channel in which wireless signals act as transmission medium. For example, for a frequency hopping communication, an HSN can be used to identify the transmission channel, wherein for a sender of information, the transmission delay is used to determine beginning time of sending the information, and for a receiver of the information, the transmission delay is used to determine beginning time of receiving the information, wherein the codeword is also known as a code pattern; for the sender of the information, the codeword is used to encode the information to be sent, and for the receiver of the information, the codeword is used to decode the information received.

In this embodiment, the transmission parameter rule comprises: a corresponding relationship of at least one frequency and at least one transmission parameter, and/or a corresponding relationship of at least one frequency range and at least one transmission parameter.

For example, 50 Hz is corresponding to a transmission delay of 5 ms, and 80 Hz is corresponding to a transmission delay of 10 ms. For another example, 50 Hz and 60 Hz are corresponding to a transmission delay of 5 ms, and 70 Hz and 80 Hz are corresponding to a transmission delay of 10 ms. For another example, a frequency range [50 Hz, 60 Hz) is corresponding to a transmission delay of 5 ms and a first codeword, and a frequency range [60 Hz, 70 Hz) is corresponding to a transmission delay of 6 ms and a second codeword.

In this embodiment, the another user equipment can be any device that can interact with a user, comprising but not limited to: a handheld device, a wearable device, etc., wherein the handheld device may be but is not limited to: a mobile phone, a pad, etc.; and the wearable device comprises but is not limited to: a smart wristband, a smart ring, etc.

In this embodiment, the equipment type of the another user equipment and that of the user equipment 500 can be the same or can be different. For example, the user equipment 500 is a mobile phone, and the another user equipment is another mobile phone or a pad; and the user equipment 500 is a mobile phone, and the another user equipment is a smart wristband.

In this embodiment, the user equipment 500 can be in contact with any part of the human body. For example, when the user equipment 500 is a mobile phone, the user equipment 500 is optionally in contact with a finger, a palm, or other part of the human body; and when the user equipment 500 is a smart wristband, the user equipment 500 is optionally in contact with a finger, a palm, a wrist, or other part of the human body.

In this embodiment, the another user equipment can be in contact with any part of the human body. For example, when the another user equipment is a mobile phone, the another user equipment is optionally in contact with a finger, a palm, or other part of the human body; and when the another user equipment is a smart wristband, the another user equipment is optionally in contact with a finger, a palm, a wrist, or other part of the human body.

In this embodiment, the user equipment 500 and the another user equipment are both in contact with the human body. The equivalent capacitance in the scenario is as shown in FIG. 2B. Therefore, when the control module 51 controls the capacitance value change of the user equipment 500 and the determining module 52 determines the at least one transmission parameter, the another user equipment can obtain the at least one frequency, and determines at least one transmission parameter which is the same as that determined by the determining module 52 based on the same transmission parameter rule, so that the user equipment 500 and the another user equipment can communicate with each other based on the same at least one transmission parameter.

In the scenario that the transmission parameter rule comprises the corresponding relationship of at least one frequency range and at least one transmission parameter, error of the at least one transmission parameter that is caused by measurement error of the at least one frequency of the another user equipment can be reduced to a certain degree.

In this embodiment, the communications contents of the communications module 53 and the another user equipment can be of multiple types, such as an instruction, sensor data, and a connection parameter that needs to be set.

In this embodiment, the user equipment controls the capacitance value of the user equipment to change at at least one frequency through the control module. The determining module determines at least one transmission parameter at least according to the at least one frequency and a preset transmission parameter rule. The communications module communicates with another user equipment at least according to the at least one transmission parameter. The user equipment and the another user equipment are both in contact with a human body. A communications solution between devices is provided. And determining at least one transmission parameter for communication between devices through an out-band method can achieve quick and convenient communication.

The user equipment 500 of this embodiment will now be further described by way of the following optional implementation manners.

In this embodiment, the control module 51 has multiple implementation manners.

In an optional implementation manner, the control module 51 is specifically configured to: control the capacitance value of the user equipment 500 to change at the at least one frequency in response to the contact between the user equipment 500 and the human body.

Reference may be made to a corresponding description in Embodiment 2 of a communications method that is provided by this application for specific implementation of the implementation manner.

In another optional implementation manner, the control module 51 is specifically configured to: control the capacitance value of the user equipment 500 to change at the at least one frequency in response to a user instruction.

In the implementation manner, optionally, the at least one frequency is carried in the instruction.

Reference may be made to a corresponding description in Embodiment 2 of a communications method that is provided by this application for specific implementation of the implementation manner.

In this embodiment, optionally, the at least one frequency may be multiple frequencies;

correspondingly, the control module 51 is specifically configured to control the capacitance value of the user equipment 500 to change at the multiple frequencies in sequence.

Reference may be made to a corresponding description in Embodiment 2 of a communications method that is provided by this application for specific implementation of the implementation manner.

In the implementation manner, controlling, by the control module 51, the capacitance value of the user equipment 500 to change at at least one frequency can be controlling, by the control module 51, the capacitance value of the user equipment 500 to change continuously or to change discretely at the at least one frequency.

For example, at least one frequency is a frequency f1. The capacitance value of the user equipment 500 is C1 when t=0. Correspondingly, the control module 51 can control the capacitance value of the user equipment 500 to change into C2 when t=1/f1, and controls the capacitance value of the user equipment 500 to change into C1 when t=2/f1. Or the control module 51 can control the capacitance value of the user equipment 500 to gradually change into C2 from C1 during the time when t=0~1/f1, and controls the capacitance value of the user equipment 500 to gradually change into C1 from C2 when t=1/f1~2/f1.

Figure 6:
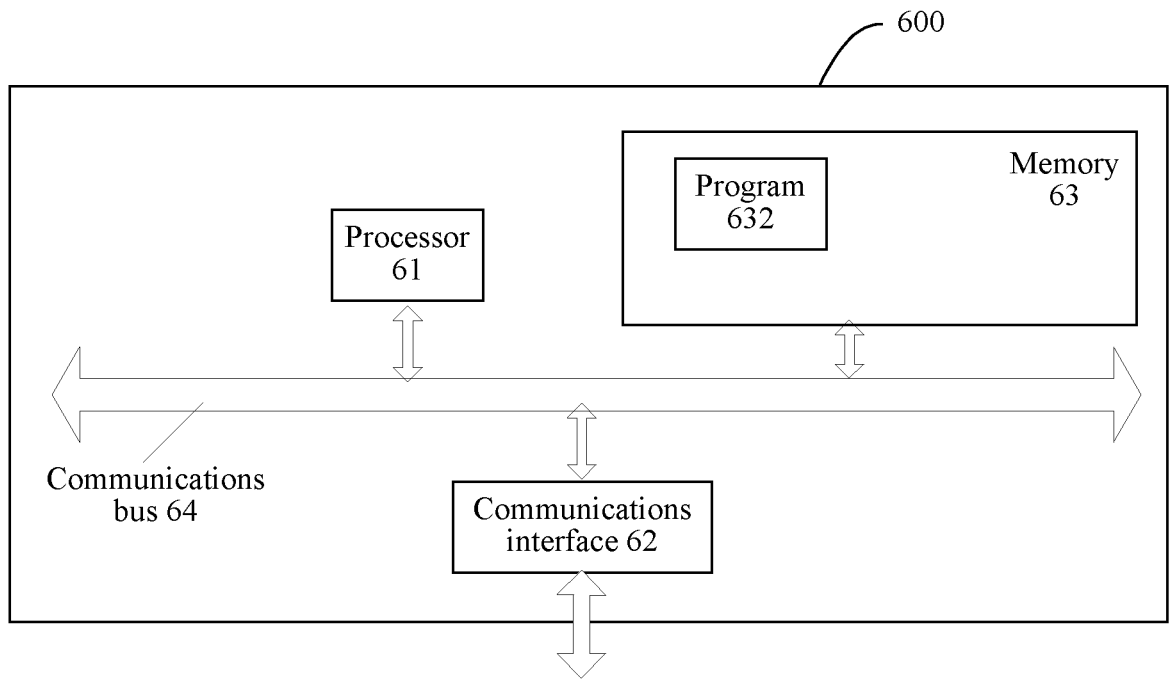
FIG. 6 is a schematic structural diagram of Embodiment 3 of a user equipment that is provided by this application.

FIG. 6 is a schematic structural diagram of Embodiment 3 of a user equipment that is provided by this application. As shown in FIG. 6, a user equipment 600 comprises:

a processor 61, a communications interface 62, a memory 63, and a communications bus 64, where:

the processor 61, the communications interface 62, the memory 63, and the communications bus 64 complete the communication among each other.

The communications interface 62 is configured to communicate with devices such as another user equipment.

The processor 61 is configured to execute a program 632, and specifically, can perform the relevant steps of Embodiment 1 of the communications method.

Specifically, the program 623 can comprise a program code, and the program code comprises computer operating instructions.

The processor 61 may be a central processing unit (CPU), or an application specific integrated circuit (ASIC), or an integrated circuit or multiple integrated circuits configured to implement Embodiment 1 of the communications method.

The memory 63 is configured to store a program 632. The memory 63 may comprise a high-speed RAM memory, and may also comprise a non-volatile memory, such as at least one magnetic disk memory. The program 632 may be specifically configured to make the user equipment 600 perform the following steps:

obtaining at least one signal value that is generated based on contact between the user equipment 600 and a human body, wherein the human body is also in contact with another user equipment;

determine at least one transmission parameter at least according to the at least one signal value and a preset transmission parameter rule; and communicate with the another user equipment at least according to the at least one transmission parameter.

Optionally, the user equipment 600 also comprises: an electrostatic charge collecting element.

Reference can be made to the corresponding description of the corresponding steps and units of Embodiment 1 of the above communications method for specific implementation of the steps in the program 632, which will not be described herein.

Figure 7:
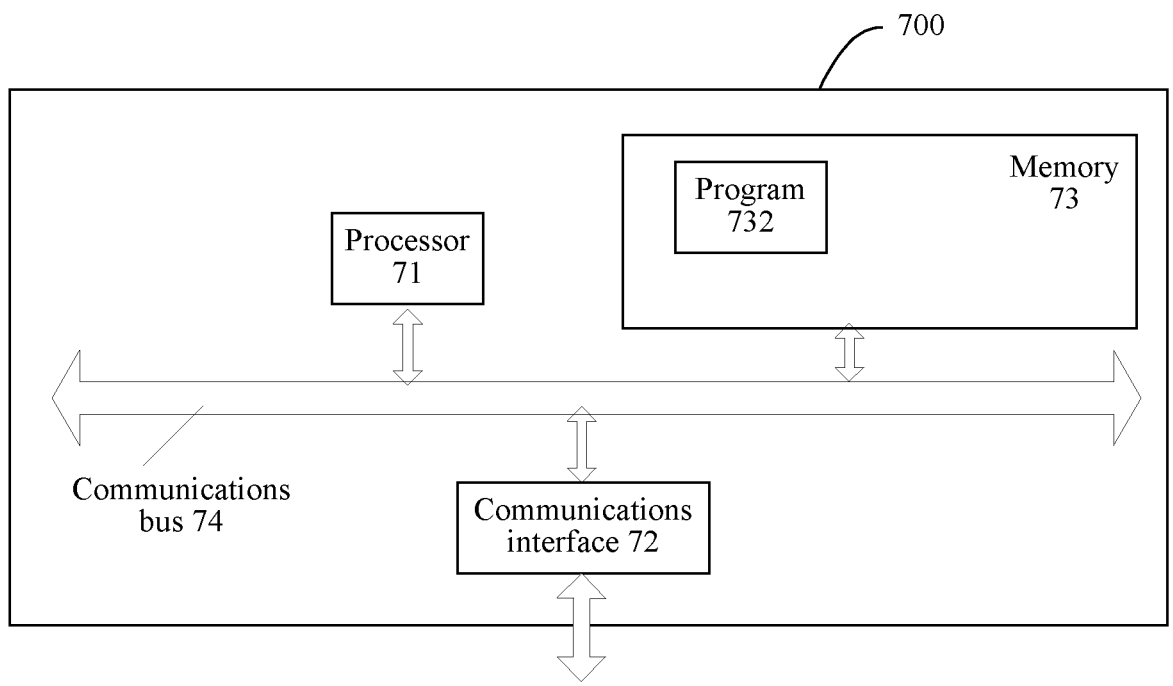
FIG. 7 is a schematic structural diagram of Embodiment 4 of a user equipment that is provided by this application.

FIG. 7 is a schematic structural diagram of Embodiment 4 of a user equipment that is provided by this application according to. As shown in FIG. 7, a user equipment 700 comprises:

a processor 71, a communications interface 72, a memory 73, and a communications bus 74, where:

the processor 71, the communications interface 72, the memory 73, and the communications bus 74 complete the communication among each other.

The communications interface 72 is configured to communicate with devices such as another user equipment.

The processor 71 is configured to execute a program 732, and specifically, can perform the relevant steps of Embodiment 2 in the above communications method.

Specifically, the program 732 can comprise a program code, and the program code comprises a computer operating instruction.

The processor 71 may be a central processing unit (CPU), or an application specific integrated circuit (ASIC), or an integrated circuit or multiple integrated circuits configured to implement Embodiment 2 of the communications method.

The memory 73 is configured to store a program 732. The memory 73 may comprise a high-speed RAM memory, and may also comprise a non-volatile memory, such as at least one magnetic disk memory. The program 732 is specifically configured to make the user equipment 700 perform the following steps:

controlling a capacitance value of the user equipment 700 to change at at least one frequency;

determining at least one transmission parameter at least according to the at least one frequency and a preset transmission parameter rule; and communicating with another user equipment at least according to the at least one transmission parameter, wherein the user equipment 700 and the another user equipment are both in contact with a human body.

Optionally, the user equipment 700 also comprises a changeable capacitor. Correspondingly, the controlling the capacitance value of the user equipment 700 to change at at least one frequency is specifically: controlling a capacitance value of the changeable capacitor to change at at least one frequency.

Reference can be made to the corresponding description of the corresponding steps and units of Embodiment 2 of the above communications method for specific implementation of the steps in the program 732, which will not be described herein.

A person of ordinary skill in the art can realize that with reference to the units and method steps of the examples that are described in the embodiments disclosed in the article, it can be achieved by electronic hardware, or the combination of computer software and electronic hardware. Whether these functions are executed by the hardware or software may depend on a particular application and a design constraint of the technical solutions. For each particular application, a professional may use a different method to achieve the described functions, but such implementation should not be considered to go beyond the scope of this application.

When the functions are implemented as software function units or are sold or used as independent products, the functions can be stored in a computer readable storage medium. Based on such understanding, the technical solutions of this application essentially or the part that contributes to the original technology or the part of the technical solution can be reflected in a form of software product. The software product may be stored in a storage medium, comprising multiple instructions that make a computer device (which may be a personal computer, a server, or a network device, etc.) perform part of or all steps of a method of the embodiments of this application. The storage medium includes: a removable flash drive, a removable hard disk, a read-only memory (ROM), a random access memory (RAM), a magnetic disk, an optical disk, and other medium that can store a program code.

The above implementation manners are only used to illustrate this application rather than to limit this application. Alterations and modifications may be made by a person of ordinary skill in the art without departing from the spirit and scope of this application. Therefore, all equivalent technical solutions also fall within the scope of this application. The patent protection scope of this application should be defined by the claims.

What is claimed is:

1. A communications method, comprising:
obtaining, by user equipment, at least one signal value that is generated based on contact between the user equipment and a human body, wherein the human body is in contact with another user equipment;
determining at least one transmission parameter corresponding to the at least one signal value based at least on a preset transmission parameter rule, wherein the preset transmission parameter rule comprises a corresponding relationship of the at least one signal value and the at least one transmission parameter, and/or a corresponding relationship of at least one signal value range and the at least one transmission parameter; and
communicating with the another user equipment at least according to the at least one transmission parameter, wherein the user equipment and the another user equipment communicates with each other based on at least one same transmission parameter,
wherein the at least one transmission parameter comprises at least one of the following: a transmission channel, a transmission delay, and a codeword.

2. The method of claim 1, wherein the at least one signal value is a static electricity variation of the user equipment.

3. The method of claim 1, wherein the at least one signal value is at least one change frequency of an equivalent capacitance on a side of the user equipment.

4. The method of claim 1, wherein the at least one signal value is a coupling capacitance value at a location where the user equipment is in contact with the human body.

5. The method of claim 4, wherein the determining at least one transmission parameter corresponding to the at least one signal value based at least on a preset transmission parameter rule comprises:
determining an induced charge quantity generated at the location where the human body is in contact with the user equipment at least according to the coupling capacitance value; and
determining the at least one transmission parameter corresponding to the induced charge quantity based at least on the transmission parameter rule.

6. A communications method, wherein the method comprises:

controlling, by user equipment, a capacitance value of the user equipment to change at at least one frequency;

determining at least one transmission parameter corresponding to the at least one frequency based at least on a preset transmission parameter rule, wherein the preset transmission parameter rule comprises a corresponding relationship of the at least one frequency and the at least one transmission parameter, and/or a corresponding relationship of at least one frequency range and the at least one transmission parameter; and communicating with another user equipment at least according to the at least one transmission parameter, wherein the user equipment and the another user equipment are both in contact with a human body, wherein the user equipment and the another user equipment communicates with each other based on at least one same transmission parameter, wherein the at least one transmission parameter comprises at least one of the following: a transmission channel, a transmission delay, and a codeword.

7. The method of claim 6, wherein the controlling, by a user equipment, a capacitance value of the user equipment to change at at least one frequency comprises:

controlling, by the user equipment, the capacitance value of the user equipment to change at the at least one frequency in response to the contact between the user equipment and the human body.

8. The method of claim 6, wherein the controlling, by a user equipment, a capacitance value of the user equipment to change at at least one frequency comprises:

controlling, by the user equipment, the capacitance value of the user equipment to change at the at least one frequency in response to a user instruction.

9. The method of claim 8, wherein the at least one frequency is carried in the user instruction.

10. The method of claim 6, wherein the at least one frequency comprise multiple frequencies; and wherein the controlling, by the user equipment, the capacitance value of the user equipment to change at at least one frequency comprises:

controlling, by the user equipment, the capacitance value of the user equipment to change at the multiple frequencies in sequence.

11. A piece of user equipment, comprising a memory and a processor, wherein the memory stores instructions executable by the processor to cause the user equipment to perform operations including:

obtaining at least one signal value that is generated based on contact between the user equipment and a human body, wherein the human body is in contact with another user equipment;

determining at least one transmission parameter corresponding to the at least one signal value based at least on a preset transmission parameter rule, wherein the preset transmission parameter rule comprises: a corresponding relationship of the at least one signal value and the at least one transmission parameter, and/or a corresponding relationship of at least one signal value range and the at least one transmission parameter; and communicating with the another user equipment at least according to the at least one transmission parameter, wherein the user equipment and the another user equipment communicates with each other based on at least one same transmission parameter, wherein the at least one transmission parameter comprises at least one of the following: a transmission channel, a transmission delay, and a codeword.

12. The user equipment of claim 11, wherein the at least one signal value is a static electricity variation of the user equipment.

13. The user equipment of claim 11, wherein the at least one signal value is at least one change frequency of an equivalent capacitance on a side of the user equipment.

14. The user equipment of claim 11, wherein the at least one signal value is a coupling capacitance value at a location where the user equipment is in contact with the human body.

15. The user equipment of claim 14, wherein the operations further comprise:

determining an induced charge quantity generated from the location where the human body is in contact with the user equipment at least according to the coupling capacitance value; and determining the at least one transmission parameter corresponding to the induced charge quantity based at least on the transmission parameter rule.

16. A piece of user equipment, comprising a memory and a processor, wherein the memory stores instructions executable by the processor to cause the user equipment to perform operations including:

controlling a capacitance value of the user equipment to change at at least one frequency;

determining at least one transmission parameter corresponding to the at least one frequency based at least on a preset transmission parameter rule, wherein the preset transmission parameter rule comprises a corresponding relationship of the at least one frequency and the at least one transmission parameter, and/or a corresponding relationship of at least one frequency range and the at least one transmission parameter; and communicating with another user equipment at least according to the at least one transmission parameter, wherein the user equipment and the another user equipment are both in contact with a human body, wherein the user equipment and the another user equipment communicates with each other based on at least one same transmission parameter, wherein the at least one transmission parameter comprises at least one of the following: a transmission channel, a transmission delay, and a codeword.

17. The user equipment of claim 16, wherein the operations further comprise controlling the capacitance value of the user equipment to change at the at least one frequency in response to the contact between the user equipment and the human body.

18. The user equipment of claim 16, wherein the operations further comprise controlling the capacitance value of the user equipment to change at the at least one frequency in response to a user instruction.

19. The user equipment of claim 18, wherein the at least one frequency is carried in the user instruction.

20. The user equipment of claim 16, wherein the at least one frequency comprise multiple frequencies; and wherein the operations further comprise controlling the capacitance value of the user equipment to change at the multiple frequencies in sequence.

21. A non-transitory computer-readable storage medium comprising executable instructions that, in response to execution, cause a processor to perform operations, comprising:

obtaining, by user equipment, at least one signal value that is generated based on contact between the user equipment and a human body, wherein the human body is in contact with another user equipment;

determining at least one transmission parameter corresponding to the at least one signal value based at least on a preset transmission parameter rule, wherein the preset transmission parameter rule comprises: a corresponding relationship of the at least one signal value and the at least one transmission parameter, and/or a corresponding relationship of at least one signal value range and the at least one transmission parameter; and communicating with the another user equipment at least according to the at least one transmission parameter, wherein the user equipment and the another user equipment communicates with each other based on at least one same transmission parameter, wherein the at least one transmission parameter comprises at least one of the following: a transmission channel, a transmission delay, and a codeword.

22. A non-transitory computer-readable storage medium comprising executable instructions that, in response to execution, cause a processor to perform operations, comprising:

controlling, by user equipment, a capacitance value of the user equipment to change at at least one frequency;

determining at least one transmission parameter corresponding to the at least one frequency based at least on a preset transmission parameter rule, wherein the preset transmission parameter rule comprises: a corresponding relationship of the at least one frequency and the at least one transmission parameter, and/or a corresponding relationship of at least one frequency range and the at least one transmission parameter; and communicating with another user equipment at least according to the at least one transmission parameter, wherein the user equipment and the another user equipment are both in contact with a human body, wherein the user equipment and the another user equipment communicates with each other based on at least one same transmission parameter, wherein the at least one transmission parameter comprises at least one of the following: a transmission channel, a transmission delay, and a codeword.

* * * * *